C. C. SIMS.
DUPLEX POURING VESSEL.
APPLICATION FILED NOV. 5, 1910.
1,025,653.
Patented May 7, 1912.
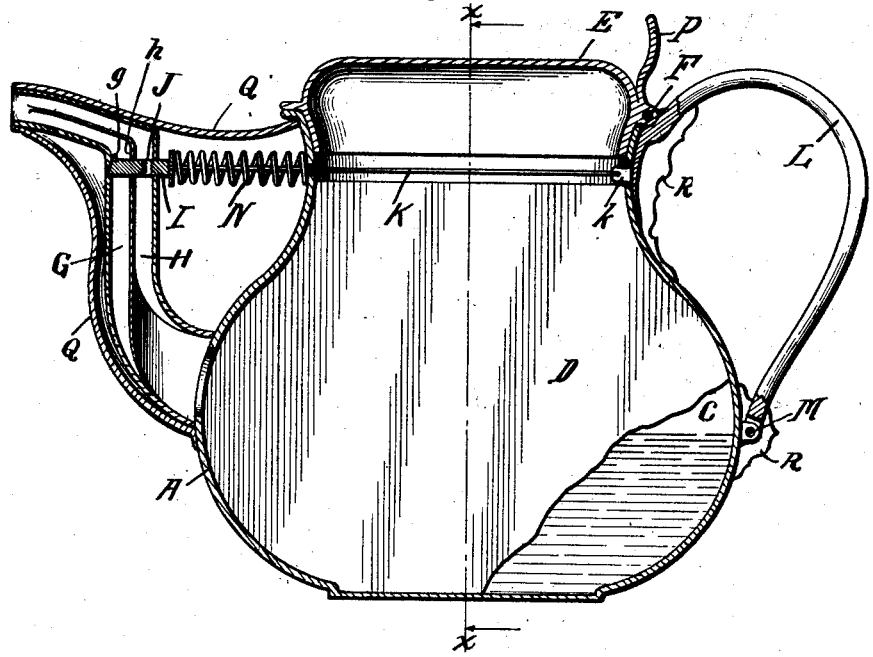
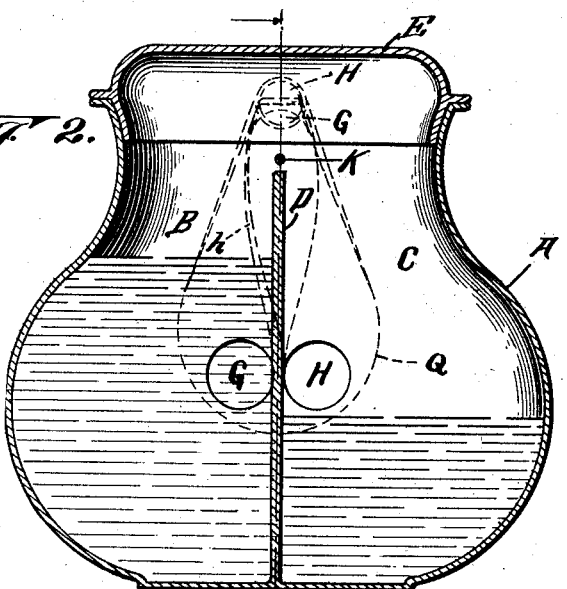
Witnesses
Inventor:
Charles C. Sims
by Erwin & Wheeler
Leverett C. Wheeler
Attys.

UNITED STATES PATENT OFFICE.

CHARLES C. SIMS, OF MILWAUKEE, WISCONSIN.

DUPLEX POURING VESSEL.

1,025,653. Specification of Letters Patent. Patented May 7, 1912.

Application filed November 5, 1910. Serial No. 590,783.

*To all whom it may concern:*

Be it known that I, CHARLES C. SIMS, a citizen of the United States, residing at Milwaukee, county of Milwaukee, and State of Wisconsin, have invented new and useful Improvements in Duplex Pouring Vessels, of which the following is a specification.

My invention relates to improvements in duplex pouring vessels, with particular reference to that type of such vessels in which a plurality of pouring spouts leading from different compartments in the vessel are valve controlled in such a manner that the liquids may be separately poured from the several compartments.

The object of my invention is to provide a form of construction, whereby the controlling valve or valves may be adjusted by the user without revealing the fact that a change in the adjustment has been made, whereby a person dispensing beverages may, if required by custom or otherwise to join with various parties in partaking of a beverage, select a lighter beverage for himself than that selected by the customer without making the fact of such selection apparent.

In the following description, reference is had to the accompanying drawings, in which—

Figure 1 is a sectional view of a pouring vessel embodying my invention, drawn to a plane which includes the axis of the controlling valve, and also the handle of the vessel. Fig. 2 is a sectional view, drawn on line $x$—$x$ of Fig. 1.

Like parts are identified by the same reference characters throughout both views.

The receptacle A may be in the form of an ordinary coffee or tea pot, or may have any other desired shape. It is divided into two compartments B and C by an interior partition D, which extends nearly to the top of the receptacle, the latter being covered by a lid E of ordinary type, preferably hinged at F to the body of the receptacle. The compartments B and C are provided with pouring spouts G and H respectively. The upper end portions of these pouring spouts are preferably so arranged that one of them occupies a position in the rear of the other, as clearly shown in Fig. 1, thus enabling me to provide a single controlling valve plug I, which may be operated as a slide valve and which is provided with a port J, normally in the spout H. The outer end portion of said valve normally closes the spout G and prevents the delivery of liquid through said spout. Said valve is connected by a rod K with a handle L, the lower portion of which is hinged to the receptacle at M, whereby the upper part of said handle may be moved outwardly or away from the wall of the vessel under a separating pressure, thus withdrawing the valve plug I sufficiently to open the spout G and close the spout H. This movement of the valve I is limited, preferably by a stop $g$ on the valve, which is adapted to engage the wall $h$, which serves as a partition between the two spouts at this point.

A spring N is interposed between the wall of the vessel A and the outer end of the valve I, and said spring is adapted to normally hold the valve in the position in which it is shown in Fig. 1, with the spout G closed and the spout H open. This spring is made strong enough to hold the valve in said position, when the vessel is tipped for pouring purposes. But when it is desired to open the spout G and close the spout H, the valve is forcibly retracted by the user, who places his thumb upon an upwardly projecting lip P connected with the body A of the vessel, or with the cover E, and applies pressure to said lip and simultaneously draws backwardly or outwardly upon the handle L.

The space between the body of the vessel and the upwardly extending portions of the spouts G and H, is preferably inclosed by a housing Q, which extends around the spouts and conceals the fact that there are a plurality of spouts. The partition wall $h$ between the two spouts also preferably terminates at a little distance within the end portion of the spouts and the housing Q, the arrangement being such that said housing Q appears to constitute a single spout for the vessel. The spring N is located within this housing and the link rod K preferably extends through the coils of the spring and through the upper portion of the vessel, preferably immediately above the partition D, said link rod being connected with an ear $k$ rigidly attached to the handle and extending inwardly through an aperture in the vessel wall.

It will of course be understood that the outer surface of the vessel wall adjacent to the hinge M of the handle, and also adjacent to that portion of the handle which carries the ear $k$, may be provided with any suitable ornamentation in relief, whereby the movability of the handle is also concealed, such ornamentation being indicated at R in Fig. 1.

What I claim as new, and desire to secure by Letters Patent, is—

1. The combination with a vessel having a plurality of interior compartments, of a set of pouring spouts, one leading from each of said compartments, a handle for lifting said vessel movably connected with the vessel on the side opposite said spouts, and concealed connections for controlling the flow of liquid through the respective spouts by an adjustment of said handle.

2. The combination with a vessel sub-divided into liquid containing compartments, of a set of pouring spouts, one leading from each of said compartments, valve mechanism controlling the flow of liquid through the several pouring spouts, a manually actuated valve operating member, connections between the operating member and the valve, and means for wholly concealing the connections, and the portion of the operating member attached thereto.

3. The combination with a vessel sub-divided into liquid containing compartments, of a set of pouring spouts, one leading from each of said compartments, valve mechanism controlling the flow of liquid through the several pouring spouts, a manually actuated valve operating member, and concealed connections between the operating member and the valve, together with a housing concealing the pouring spouts and constituting part of the concealing means for the valve actuating connections.

4. In a device of the described class, the combination of a vessel, sub-divided into liquid holding compartments and provided with a plurality of spouts, each leading from one of said compartments, a valve normally closing one of said spouts and permitting the delivery of liquid through the other, means for adjusting the valve to open the normally closed spout and close the normally open spout, a housing projecting from one side of the vessel and embracing the spouts, an adjustable handle for said vessel, and concealed connections between the handle and valve extending through the upper portion of the vessel and through said housing.

5. In a device of the described class, the combination of a vessel, sub-divided into liquid holding compartments and provided with a plurality of spouts, each leading from one of said compartments, a valve normally closing one of said spouts and permitting the delivery of liquid through the other, means for adjusting the valve to open the normally closed spout and close the normally open spout, and an adjustable handle for lifting said vessel connected with the valve actuating means, said valve actuating means and valve being normally concealed from view.

6. In a device of the described class, the combination with a vessel sub-divided into liquid containing compartments, of a set of spouts, each leading from one of said compartments, valve mechanism controlling the delivery of fluid through said spouts, a vessel lifting and outwardly swinging handle located on the opposite side of the vessel from that on which said spouts are located, and concealed connections for operating the valve mechanism from the handle side of the vessel, the connections between the handle and the vessel being also concealed.

In testimony whereof I affix my signature in the presence of two witnesses.

CHARLES C. SIMS.

Witnesses:
LEVERETT C. WHEELER,
IRMA D. BREMER.

---

Copies of this patent may be obtained for five cents each, by addressing the "Commissioner of Patents, Washington, D. C."